(12) United States Patent
Ittah

(10) Patent No.: US 11,216,863 B2
(45) Date of Patent: Jan. 4, 2022

(54) SYSTEM AND METHODS FOR ADVANCED PERSONALIZED RETAIL SHOPPING PLATFORM

(71) Applicant: Royal App Ltd., Ashdod (IL)

(72) Inventor: Roy Ittah, Ashdod (IL)

(*) Notice: Subject to any disclaimer, the term of this patent is extended or adjusted under 35 U.S.C. 154(b) by 0 days.

(21) Appl. No.: 16/679,210

(22) Filed: Nov. 10, 2019

(65) Prior Publication Data

US 2020/0082456 A1    Mar. 12, 2020

Related U.S. Application Data

(63) Continuation of application No. 15/547,497, filed as application No. PCT/IB2016/050505 on Feb. 1, 2016, now Pat. No. 10,475,104.

(60) Provisional application No. 62/110,626, filed on Feb. 2, 2015.

(51) Int. Cl.
| | |
|---|---|
| *G06Q 30/00* | (2012.01) |
| *G06Q 30/06* | (2012.01) |
| *G06Q 30/02* | (2012.01) |
| *G06Q 50/00* | (2012.01) |
| *G06F 3/0488* | (2013.01) |
| *G06F 3/0481* | (2013.01) |
| *G06F 3/0485* | (2013.01) |
| *G06F 3/0482* | (2013.01) |

(52) U.S. Cl.
CPC ....... *G06Q 30/0631* (2013.01); *G06F 3/0485* (2013.01); *G06F 3/04817* (2013.01); *G06F 3/04886* (2013.01); *G06Q 30/02* (2013.01); *G06Q 30/0269* (2013.01); *G06Q 30/06* (2013.01); *G06Q 30/0643* (2013.01); *G06Q 50/01* (2013.01); *G06F 3/0482* (2013.01)

(58) Field of Classification Search
None
See application file for complete search history.

(56) References Cited

U.S. PATENT DOCUMENTS

| | | | | |
|---|---|---|---|---|
| 10,127,596 | B1 * | 11/2018 | Franke | G06Q 30/0641 |
| 10,592,882 | B1 * | 3/2020 | Viswanath | G06Q 20/206 |
| 2003/0023483 | A1 * | 1/2003 | Messner | G06Q 10/087 |
| | | | | 705/14.24 |
| 2008/0126937 | A1 * | 5/2008 | Pachet | G06F 3/017 |
| | | | | 715/720 |

(Continued)

*Primary Examiner* — Mila Airapetian
(74) *Attorney, Agent, or Firm* — Dr. Hanan Farber Patent Agent Ltd.

(57) ABSTRACT

A method and graphical user interface in a digital retail shopping system. A client device is in communication with a network. The client device has a display said network connectable to a server and a database of products for purchase. A view of a selected product is presented on the display. A detail of a selected product is retrieved from the database. A detail of the selected product is presented on the display. A personal preferences profile of the user is processed. A comparison parameter is determined, associated with the detail of the selected product and the personal preferences profile of the user. Based on the comparison parameter, an advisory message is generated related to the selected product and the personal preferences profile. The advisory message on the display of the client device is displayed with the view of the selected product and with a detail of the selected product.

20 Claims, 10 Drawing Sheets

(56) References Cited

U.S. PATENT DOCUMENTS

2011/0153396 A1* 6/2011 Marcuvitz .......... G06Q 30/0245
　　　　　　　　　　　　　　　　　　　　　705/14.2
2014/0156392 A1* 6/2014 Ouimet .............. G06Q 30/0633
　　　　　　　　　　　　　　　　　　　　　705/14.49

* cited by examiner

SYSTEM AND METHODS FOR ADVANCED PERSONALIZED RETAIL SHOPPING PLATFORM

FIELD OF THE INVENTION

The present invention is directed to proving an advanced digital retail platform for personalized shopping. In particular, the disclosure relates to enabling informed decision making while shopping combined with improved personal experience and advisory messaging.

SUMMARY OF THE INVENTION

It is according to one aspect of the disclosure, in a system comprising at least one communication device in communication with a communication network, the communication network being connected to a management server and at least one database, a computer implemented method is taught for operating the management server to generate personalized shopping information in an improved manner, the method comprising:
  receiving, from a retail application operating on the communication device, details relating to behavior of a user of the communication device;
  identifying at least one product selected or currently viewed by the user;
  retrieving data relating to the product;
  retrieving data pertaining to the user;
  generating an advisory message relating to the product and pertaining to the user; and
  communicating the advisory message to the communication device.

The method may further comprise the steps:
  receiving a request from the communication device for data relating to at least one product; and
  retrieving details relating to at least one comparable product from an associated product data repository.

Where appropriate, the step of retrieving data relating to the product comprises accessing data relating to at least one product from a product data repository.

Where appropriate, the step of generating the advisory message comprises:
  analyzing a product preferences profile file;
  determining a set of comparison parameters; and
  assigning a weight value for each parameter of said set of comparison parameters in correlation with the user profile and personal preferences.

The method may further comprise the steps:
  classifying said set of comparison parameters; and
  assigning a text (or image or video or other type of) message of said advisory message.

The method may further comprise the step of ordering selected products from a supplier.

Where appropriate, the supplier is a manufacturer of the product.

The method may further comprise the step of populating a product data repository by accessing data directly from a manufacturer of the product.

It is according to another aspect of the disclosure, in a system comprising at least one communication device in communication with a communication network, the communication network being connected to a management server and at least one database, a computer implemented method is taught for operating the communication device to provide personalized shopping information to a user in an improved manner, the method comprising:
  executing a retail application;
  selecting or viewing, via the retail application, a product;
  communicating user behavior to the management server;
  presenting selected product to a user;
  receiving from the management server, at least one advisory message related to the selected product and pertaining to the user; and
  presenting at least one advisory message to the user.

Where appropriate, the advisory message may be selected from at least one of a group consisting of: text messages, images, video files, audio files and combinations thereof.

It is according to yet another aspect of the disclosure, a digital retail shopping system for providing a product consumer with a personalized shopping experience is provided, the system comprising:
  at least one database in communication with a computing network and operable to store data relating to a plurality of products and data pertaining to a plurality of users;
  a management server in communication with the computing network, the management server operable to access product-related data from the database, to access user-pertinent data, and to generate advisory messages; and
  a communication device in communication with the management server via the computing network, the communication device operable to execute a retail application, to present products to a user; to identify at least one consumer product selected or viewed by the user, to communicate user behavior to the management server, and to receive the advisory messages from the management server.

The system may further comprise at least one external entity data resource operable to analyze product related details and configured to monitor continuously shopping behavior of the product consumer and provide a classified personalized advisory message associated with the at least one consumer product.

Where appropriate, the communication device may selected from a group consisting of a back office client, a mobile client, a web client, a third party client, a set of flat files, reports and combinations thereof.

Where appropriate, the management server may comprise:
  a data processing engine operable to perform comparability analysis and generate the advisory message;
  a personalization engine operable to continuously monitor user behavior and update a personal preferences profile;
  a business information engine operable to extract product data details from the external entity data resources; and
  a data repository operable to store data pertaining to the at least one user.

The system may further comprise a prediction engine operable to predict desired consumer products for purchase by the product consumer.

Where appropriate, the external entity may be selected from a group consisting of a retailer entity; product manufacturer entity; and third party commercial entity.

Where appropriate, the data resource may be selected from a group consisting of a database; a set of data files; and a web-site.

The system may further comprise a campaign engine operable to allow connectivity of a third-party entity to provide re-pricing functionality and defining said third-party entity business strategy.

BRIEF DESCRIPTION OF THE FIGURES

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings.

DESCRIPTION OF THE PREFERRED EMBODIMENTS

Aspects of the present invention relate to providing systems and methods for efficient shopping experience across a communication network. In particular, the disclosure relates to enabling selection of at least one consumer product from various repositories associated with various retailers and product manufacturers, such that the selected consumer product is according to consumer personal preferences.

The digital shopping platform may comprise two sub-systems, a frontend system and a backend module system, each operable independently and continuously to yield a personalized shopping experience. Further, the backend module system may control the logic of the digital shopping platform, by analyzing product related data, product consumer selections combined with data pertaining to consumer personal preferences, thereby identifying the most appropriate advisory message associated to a specific consumer selection of a product.

The front end module sub-system may comprise a digital shopping web site or a software application, operable to be installed on various types of communication devices such mobile devices, tablets, laptops, personal computers and the like.

The backend module sub-system may comprise a management server in communication with a data repository comprising at least one database, and the frontend module via a communication computing network. The data repository system architecture may comprise databases storing different aspects of data, such as product related data, product consumer pertaining data and further issues of campaign management or dynamic re-pricing as described in FIG. 1B.

In particular, the sub-system of the current disclosure may provide parallel functioning of the backend module sub-system and the frontend module sub-system, operable to monitor continuously, the consumer behavior and adjust the advisory message and the personal preference of a consumer, while shopping.

DESCRIPTION OF THE EMBODIMENTS

Figure 1A:
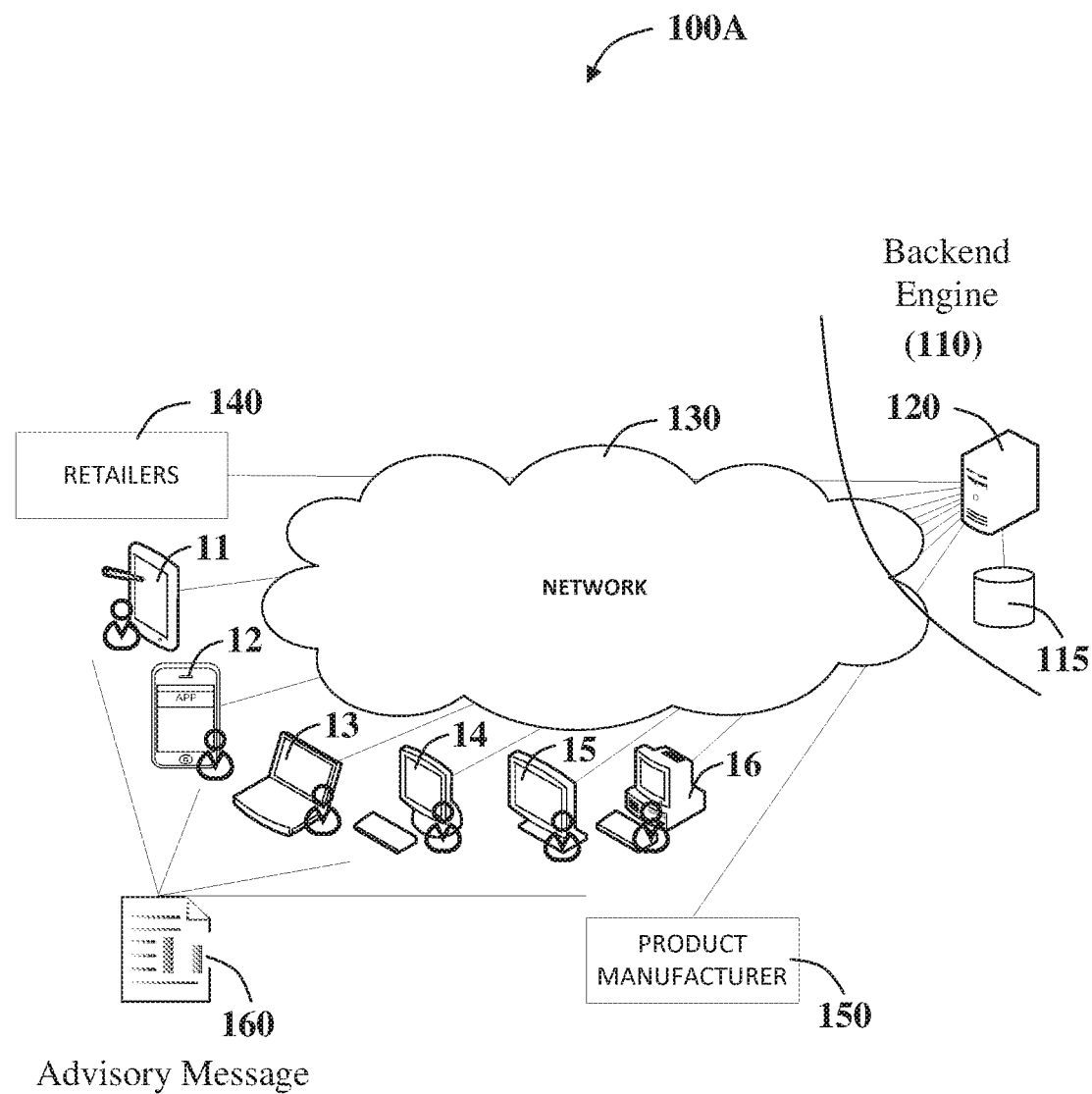
FIG. 1A is a block diagram showing the main elements of a digital retail shopping platform incorporating a communication system according to a first embodiment of the invention.

Reference is now made to FIG. 1A showing a block diagram of the main elements of a digital retail shopping platform 100A incorporating a communication system 130 according to a first embodiment of the invention.

The digital retail shopping platform 100A may consist of a frontend module installed on a computerized device such as a digital retail shopping software application connectable to a backend module 110 via a communication network 130. Where appropriate, the computerized device running the digital retail shopping software application may be selected from a group consisting of a tablet 11, a smartphone device 12, a laptop computer 13, a display screen 14, a workstation computer 15, a personal computer 16, a smart glass (not shown), a smart watch (not shown), smart refrigeration unit (not shown), other Internet-of-things (IOT) devices and combinations thereof.

The backend module 110 may include a management server 120 connectable to a data repository 115, directly or via a communication network 130. The data repository 115 may include at least one database for storing data related to consumer products and data pertaining to the product consumers. Additionally, various other types of database may be included to allow connectivity of third parties, for example. Such databases may allow campaign management, dynamic re-pricing of consumer products and the like, as described in FIG. 1B.

Figure 1B:
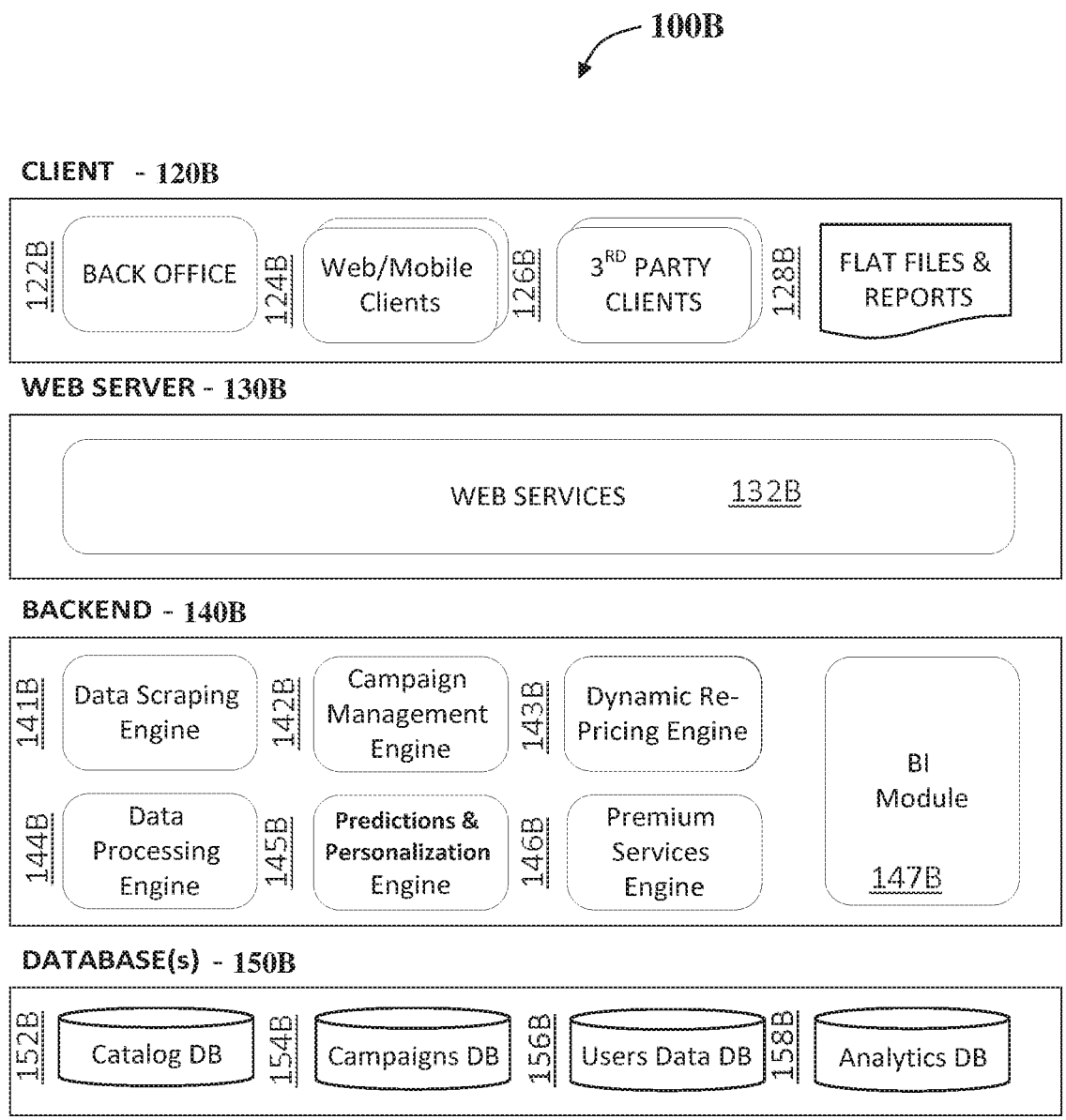
FIG. 1B is a block diagram showing the main elements of a possible system architecture of the digital retail shopping platform.

Reference is now made to FIG. 1B showing a block diagram of the main elements of a digital retail shopping platform 100B illustrating a possible system architecture including a frontend module 120B and a backend module 140B, according to a first embodiment of the disclosure.

The digital retail shopping platform 100B may consist of a client module 120B, a web server 130B, a backend module 140B and a repository module 150B.

The client module 120B may be selected from a group consisting of a back office interface 122B; a web or a mobile client 124B; a third party client 126B; and may further include flat files and reports 128B and combinations thereof.

The web server 130B may further provide web services 132B operable as web application components and configured to communicate with open protocols where HTTP and XML form the basis of the web services.

The backend module 140B comprises a data scraping engine 141B for extracting product related data from commercial web sites; a campaign management engine 142B for allowing external entities (retailers, product manufacturers, brands) to establish and maintain self-product promotions and lifestyle campaigns within the digital retail shopping platform; a dynamic re-pricing engine 143B for allowing retailers to define retailer specific re-pricing strategy; a data processing engine 144B for loading the extracted product data (XML files) into a unified catalog database; a predictions and personalization engine 145B for managing user interaction and shopping history determining user shopping behavior and predicting user preferences of shopping; a premium services engine 146B for providing various specific on-demand services; and a business information module 147B for providing the tools for determining user behavior, predictions and market analysis.

It is noted that, where required, the personalization in the digital shopping platform may be achieved automatically by continuously monitoring consumer interactions by collecting, accumulating and analyzing interactions while shopping.

The gathered information may be updated and stored in real-time in the data repository of the platform system. Such data may further be used by a business information engine, for example, to allow predictions of consumer future shopping preferences.

Web Scraping Engine

The Web Scraping Engine may use a computer software technique of extracting information from web-sites, such as web-sites of supermarket stores, retailer chains, product manufacturers and the like. Web Scraping Engine may comprise a set of complex and comprehensive infra-structured Perl scripts, for example which may be designed to provide robust scraping of target grocery websites' content, for example. The extracted data from the various sources may be automatically analyzed and then inserted into structured Product Data XML files. The extracted data may include product related details info available online including products images, prices, attributes and the like.

Data Processing Engine (DPE):

The Data Processing Engine, may be a set of complex and comprehensive infra-structured PHP scripts which may designed to efficiently and rapidly load the extracted product data (XML files) into a unified Catalog DB, for example. The Data Processing Engine, may further be operable to automatically identify similar products originated from different sources, auto-categorize existing and new products into the right categories, automatically identify and handle data errors, automatically manage and maintain products images.

Dynamic Re-Pricing Engine (DRE):

The Dynamic Re-Pricing may be operable as a third party interface, allowing retailers and product manufacturers to define their own re-pricing strategy within the digital shopping platform, thereby up-scale and better compete over consumer cart's total price effectively.

The Re-Pricing mechanism may be operable to calculate the strategic-sale score of the current potential sale for each of the relevant retailers based on their real-time strategic parameters values. Accordingly, the Dynamic Re-pricing Engine (DRE) 143B may identify the retailer which obtains the highest strategic-sale score for the current potential sale and calculate the minimal discount value needed to become the cheapest cart price offer among all of the relevant retailers. Furthermore, the DRE 143B may provide the user with a personalized discount coupon to be used for purchasing his cart with the selected retailer.

It is a feature of the dynamic re-pricing mechanism that prices may be personalized for each individual transaction. It is noted that price personalization may be implemented for individual items where appropriate. Additionally or alternatively, price personalization may be implemented for a collection of items, such as a complete shopping cart of groceries, an outfit of clothes or the like. Regarding cart-centric pricing, it is noted that value of a particular shopping cart may be determined according a variety of factors. A valuation function may be provided to return a strategic-sale score indicating the value of the current transaction. Factors influencing the value of a particular collection of goods may include purchaser characteristics such as shopping habits, frequency or expected profit from transactions, delivery address and the like. Other factors influencing the value of a particular collection of goods include transaction characteristics such as absolute profit of transaction, availability of goods, shelf life of ordered goods, delivery costs and the like. Still other factors influencing the value of a particular collection of goods may be retailer specific.

Accordingly, the Dynamic Re-pricing Engine 143B may analyze the collection of goods to provide a basket ranking, a strategic-sale score or transaction valuation for a collection of goods to a retailer. The retailer may therefore provide an incentive to the potential purchaser to buy the collection goods from them. Such incentives could take the form of a discount, a coupon, a gift, a free delivery or the like. It is further noted that where multiple retailers offer the same goods for sale. The retailers may be encouraged to bid for the transaction. Optionally, the highest discount offered by a retailer may be presented to the potential purchaser. Alternatively, various discounts and incentives may be presented to a purchaser such that the purchaser can choose the retailer from which they wish to buy the goods.

Products Predictions and Personalization Engine:

Personalization of the digital shopping platform may be achieved by defining basic parameters by the product consumer. Additionally or alternatively, the shopping platform may continuously monitor consumer interactions via the front end software application and by collecting, accumulating and analyzing the consumer interactions. The analysis of the personal preferences may be constantly logged into a dedicated consumer personal preference file of database and further be analyzed and processed into specific actions to allow applicable changes to the advisory message, allow product consumer predictions, for example.

It is noted that prediction of the consumer's next desired list of products may allow shortening the consumer's shopping time. Accordingly products may be loaded by a web service which may query the user data database for the specific user's list of products. By way of example, such a list may be accessed via a "Smart Shelf" button (see FIG. 6).

It is further noted that consumer's profile analysis may be based upon accumulated frontend module software application usage to improve in-application promoted products recommendation engine and the personalized importance rank of each available products' attributes per each user.

Campaign Management Engine (CME):

The Campaign Management Engine mechanism may provide third party affiliates (Retailers, Product manufacturers, Lifestylists and Brands) the ability to establish and maintain their own products promotions campaigns in the digital shopping platform to allow a single product level targeting and accuracy.

Campaigns may be generated by a campaigner such as the retailer, product manufacturer, a lifestylist or the like choosing to promote particular products which may be specified or selected according to segments, dates or the like. Accordingly the campaigner may provide a tag line for a product such as "more flavor", "less sugar", "extra points" or the like. Such tag lines could be targeted to a particular purchaser, for example, a purchaser who has indicated a preference for low fat products, may be shown an appropriate tag line such as "fewer calories" whereas another purchaser who has shown a preference for less salt may be shown an alternative tag line such as "no added salt" or the like. Other content may be provided such as product reviews or purchase advice may be provided by campaigners such as lifestylists.

Campaigns may furthermore provide alternative product suggestions. For example a purchaser of one product may be presented with an alternative product, so for example a purchaser may be presented with a suggested oven baked variety of chip alongside a fried chip, or perhaps a rice cracker rather than a bran cracker. Sponsored campaigns may be indicated to a purchaser by the use of indicators such as colored spots or the like.

Such alternative product suggestions may be presented variously, for example, a small icon representing a suggested alternative product may enter from the side of the screen where it replaces the product originally indicated adjacent to the currently selected product.

It is further noted that a third party lifestyle campaign may be enabled by a lifestylist. Users may choose to adhere a particular lifestylist, or lifestyle. This may be enabled via a social network where members of the social network may choose to follow the suggestions of a particular celebrity stylist, friend, link or contact.

Where required, the lifestylist introducing personalized parameters to be used in selection of a suggested product. For example, a weight management campaigner may provide a point ranking for various food items and a purchaser may choose to have this parameter indicated while goods are being selected. It is further noted that lifestyle parameters may be used by selection algorithms for generating alternative product suggestions, as required.

It is noted that the system architecture particulars of the digital retail shopping platform 100B is presented only by way of example and for purposes of illustrative discussion. Other alternative system designs may be valid.

Figure 2:
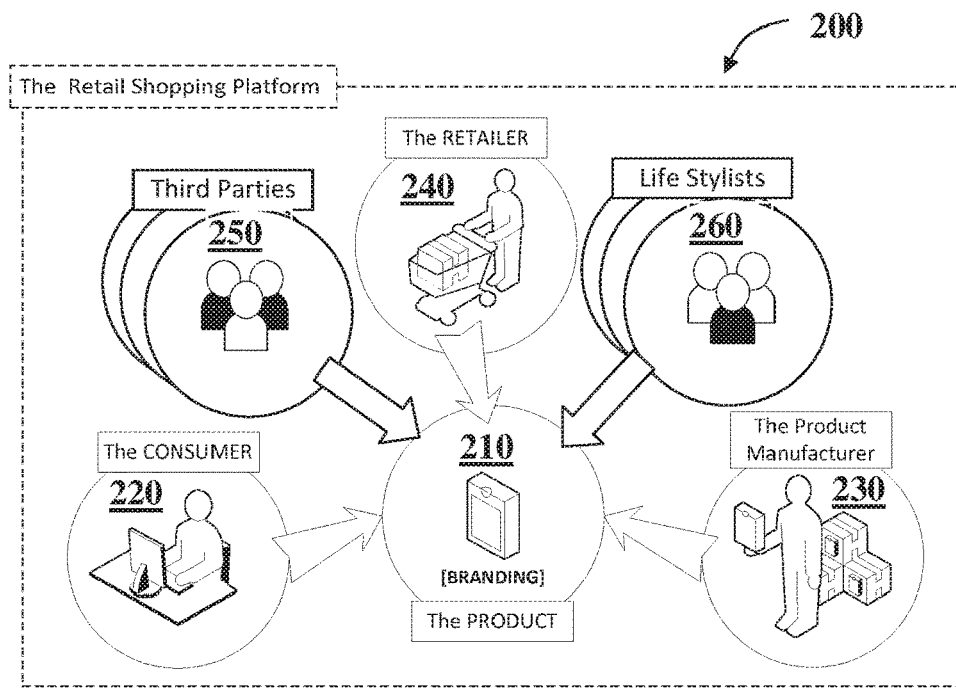
FIG. 2 is a schematic diagram representing market players potentially using the digital retail shopping platform, focusing on the consumer product.

Reference is now made FIG. 2 is showing a schematic diagram 200 representing market players potentially using the digital retail shopping platform, focusing on the consumer product.

The schematic diagram 200 represents the main components of interactions in the digital retail shopping platform, putting the consumer product 210 in which a product consumer 220 is interested in the center.

Additionally, there are other market players of importance with respect to the digital retail shopping platform notably the product manufacturer 230, retailer 240, as well as third party advisors 250, lifestylists 260 and the like.

A third party advisor 250 may be a friend, contact or link such as a celebrity or the like that a user has opted to follow. Such a third party 250 may offer purchasing advice to the user.

Similarly, a lifestylist 260 may provide purchasing advice to the users. For example, a health advisor, such as a dietitian may provide health advice to shoppers purchasing food goods, for example. In other applications a fashionista, celebrity or clothes stylist may suggest suitable clothes and outfits to be selected by a consumer.

Figure 3:
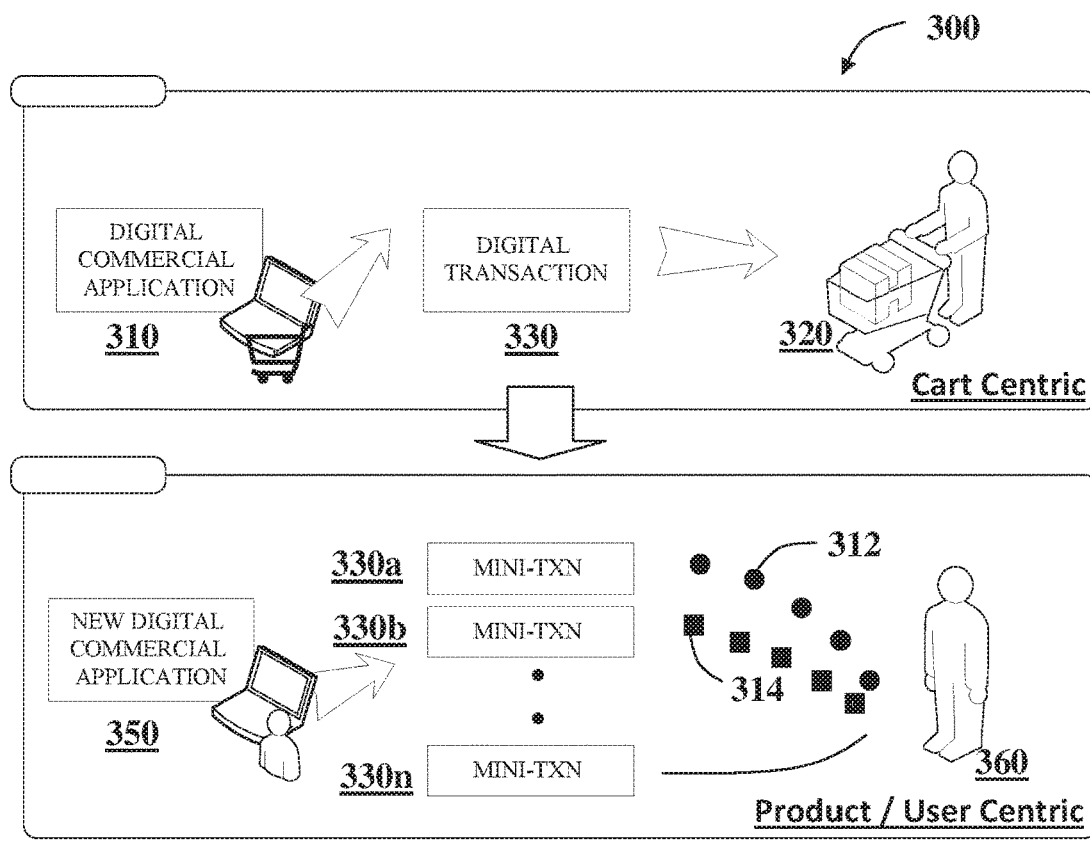
FIG. 3 is a schematic diagram showing an existing concept of shopping focusing on a shopping cart and the new alternative concept of shopping, focusing around the consumer product.

Reference is now made FIG. 3 is showing the concept representing most common shopping experience which is primarily "cart" centric focusing on the shopping cart of the consumer and mainly referring to the price as the decisive parameter and the new alternative concept of shopping of the current disclosure, focusing around the consumer product and the product itself.

The cart centric shopping experience may include a commercial web site or a software application 310 used by a product consumer 320, creating a single transaction 330 for transferring a list of consumer products from a supermarket, for example into a consumer cart. Accordingly, price personalization may be implemented for a collection of items allowing cart-centric pricing in keeping with various factors such as purchaser characteristics, transaction characteristics as well as retailer specific factors.

Additionally or alternatively, the current disclosure introduces a product centric shopping concept based upon consumer interactions for every specific product. The user application 350 may create multiple mini-transactions 330a, 330b through 330n where each mini-transaction may be associated with a single product to answer the personal preferences of a product consumer.

For example, mini-transaction 330a may be generated to allow the product consumer 360 to select a specific product 312, which may be the original product the consumer requested, or may be a comparable product selected in response to an advisory message received, offering a preferred alternative product.

It is noted that when reference is made to a better or preferred product, such preferences are considered from the consumer perspective according to personal preferences.

Suggested products may include recommended alternative brands of the same goods which may be preferred because of price, taste or other preference. Other suggested products may include recommendations of alternative goods which may be preferred such as a gnocchi alternative to pasta or a cracker alternative to bread, for example. Good may be associated with related product reviews or lifestyle related content offering advice to the consumer.

Figure 4A:
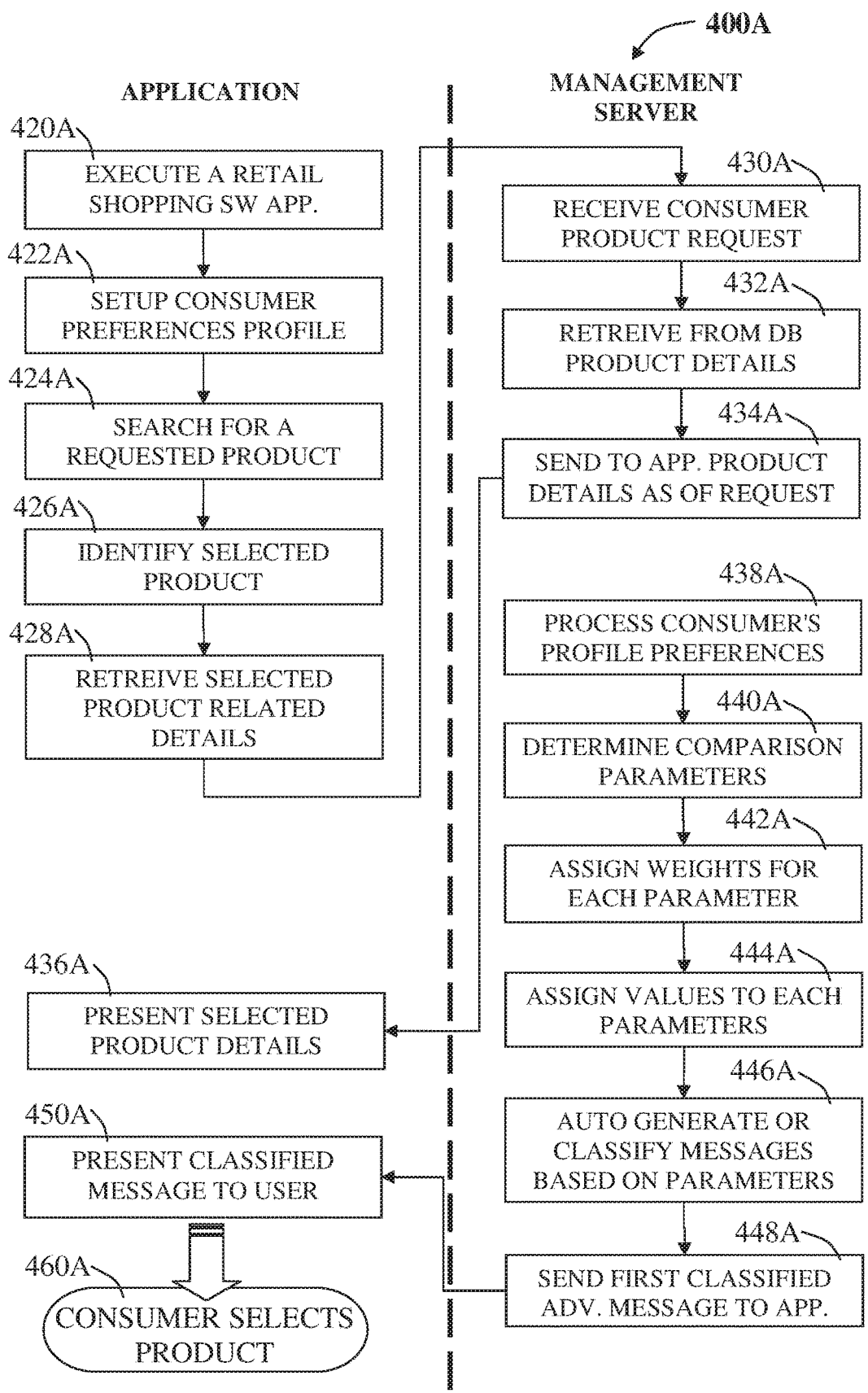
FIG. 4A is a flowchart representing selected actions of a possible shopping flow for a consumer communicating with a backend module on a remote management server via a frontend module application.

Reference is now made to the flowchart of FIG. 4A representing selected actions of a method 400A illustrating a possible shopping flow for a consumer communicating with a backend module running on a remote management server via a frontend module application. The method 400 is operable for enabling a consumer to experience efficient shopping process online according to personal preferences.

The method 400A is described spanning two nodes of a distributed system architecture, based upon a centrally managed server controlling communication requests between a frontend module and a backend module connectable to a repository comprising at least one database for storing at least consumer preferences and various consumer products and related data.

Figure 4B:
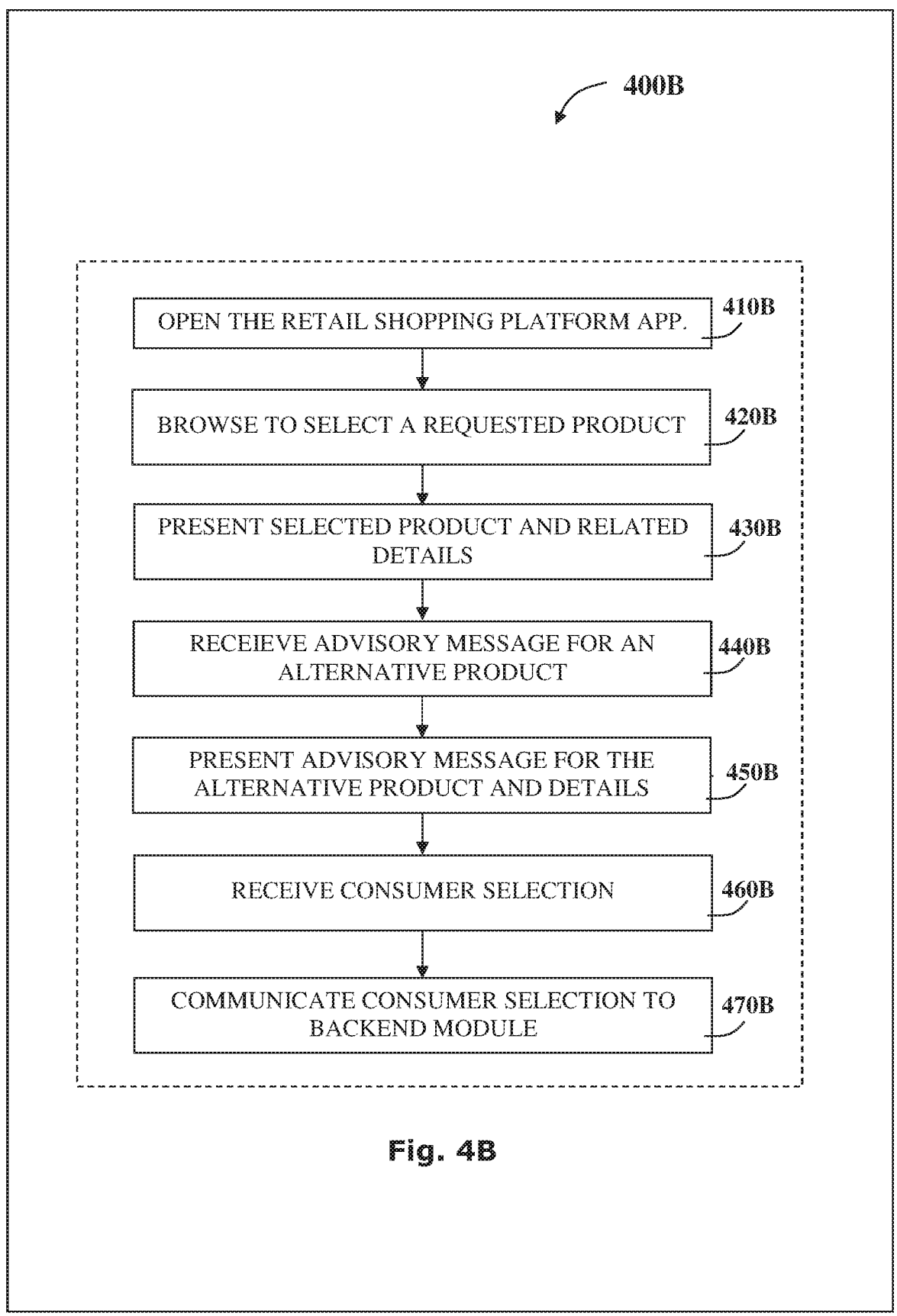
FIG. 4B is a flowchart showing a method for the shopping experience via a digital retail shopping application installed as a frontend module in accordance with the invention.
Figure 4C:
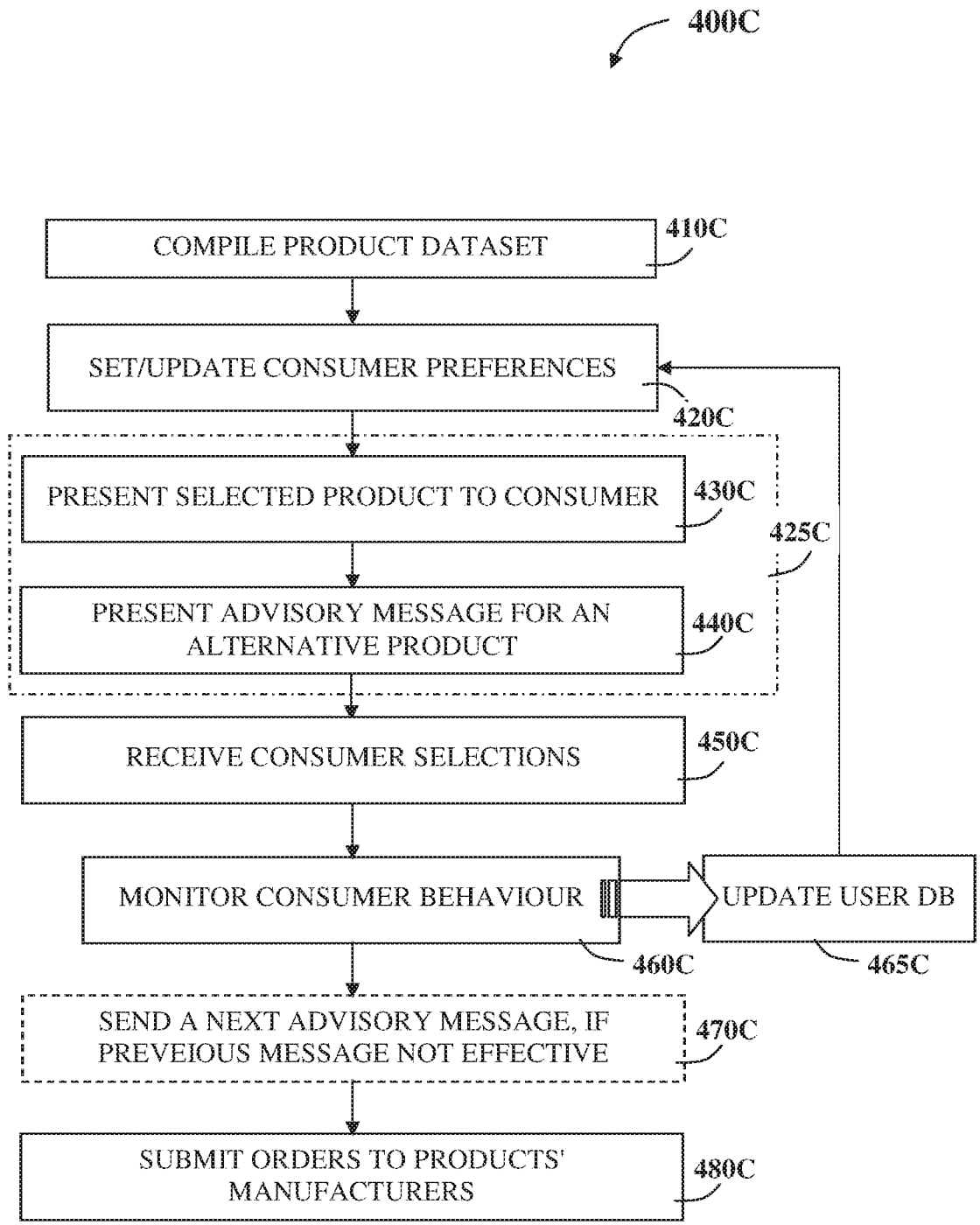
FIG. 4C is a flowchart showing a method for the shopping experience performed on a remote management server in communication with digital retail shopping applications in accordance with the invention.
Figure 4D:
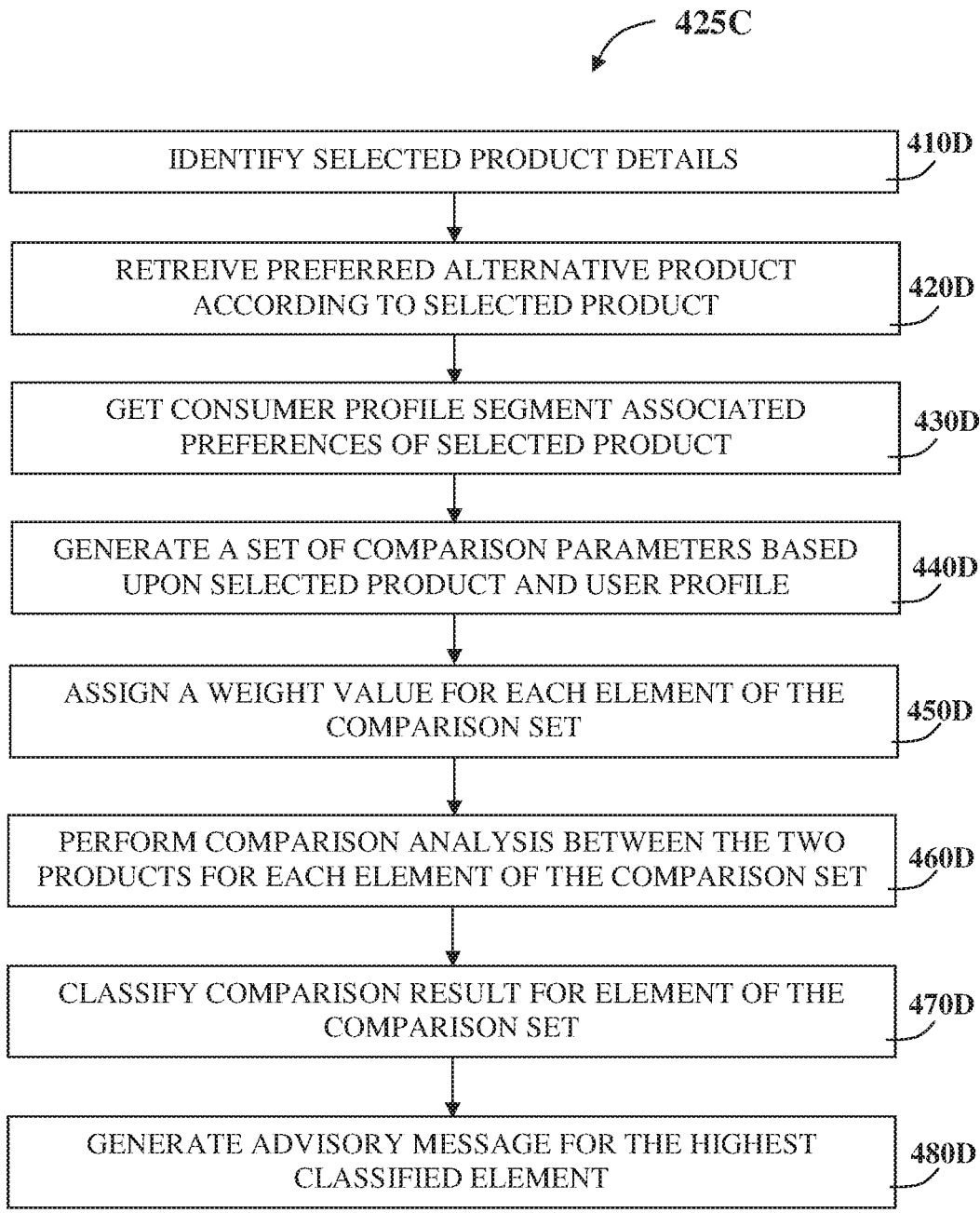
FIG. 4D is a flowchart showing a method for providing the product consumer with an advisory message for an alternative consumer product.

It is noted that FIGS. 4B-D further describe the functionality of associated methods.

The method 400A may include executing a retail shopping software application on a client device such as a smartphone, a tablet, a laptop, a personal computer and the like—step 420A; and setting up the consumer profile with related personal preferences—step 422A, for example, by accessing of health and preferences indicators of the consumer perhaps by integrating with external sources such as smartphone health software applications, smart watches and the like.

Optionally, the consumer profile may include various groupings of personal preferences in separate categories.

Furthermore, the method includes searching for a requested product pertaining to the consumer—step 424A, or optionally browsing a list of products pertaining to the consumer. Accordingly, the product currently selected by the consumer may be identified—step 426A and the details relating to the selected product may be retrieved from the backend module—step 428A.

The method 400A on the backend module side may start by receiving a request for details related to selected consumer product, from the retail shopping software application—step 430A, where the request may include, where appropriate, consumer and product identification data or data pertaining to groupings or categories. Thus allowing the retrieving of details related to the product from the product associated database—step 432A and sending to the retail shopping software application the retrieved related data details—step 434A, in a structured data message.

Accordingly, on the frontend module side the received data message may be presented for the requested product—step 436A. On the backend module side, the consumer's personal preferences profile maybe processed—step 436A. By processing the personal profile, comparison parameters associated with the details related to the requested product may be determined—step 440A, and weights for each comparison parameters may be assigned—step 442A and assigning a value for each such parameters—step 444A, possibly according to analysis of consumer's personal preferences. The comparison parameters may be automatically generated or classified—step 446A; and a first generated or classified advisory message may be sent to the frontend module user application—step 448A.

It is noted that the classified advisory message may include text, tabulated message, related image, video content, audio content and the like.

The method may continue with the retail shopping software application presenting the advisory message to the consumer—step 450A thereby allowing consumer decision for the desired product—step 460A.

Reference is now made to the flowchart of FIG. 4B representing selected actions of a method 400B illustrating a possible shopping interactions of a consumer communicating with a backend module, via a digital retail shopping software application in accordance with the invention.

The method 400B may include executing a retail shopping software application on a client device such as a smartphone, a tablet, a laptop, a personal computer and the like—step 410B, as the frontend setting of the platform. The application may be used to browse to select a requested product from a list—step 420B. Alternatively, or additionally a user may search for the requested product by typing in search parameters or by activating a search by voice via a voice recognition module. Accordingly, the requested product may be presented alongside related product details pertinent to the consumer—step 430B. Furthermore, an advisory message may be received advising the user of options for alternative brands or products relating to the requested product selected by the consumer—step 440B. Accordingly, the advisory message for the alternative product may be presented—step 450B, for example as a text message or the like. Additionally or alternatively, the advisory message may take various forms such said message text, image, video clip, audio session and the like. Accordingly, the consumer may select the specific product—step 460B; and the selection may be communicated to the backend module—step 470B.

It is noted that, the shopping platform may continuously monitor and perform comparable analysis of consumer decisions upon receiving the advisory message. This may serve to provide further classified messages, or updating consumer preferences profile, to allow for improving advisory messages in future purchases.

Reference is now made to the flowchart of FIG. 4C representing selected actions of a method 400C illustrating possible shopping interactions on the backend module while communicating with a frontend module in accordance with the invention.

The method 400C may include compiling a dataset related to consumer products—step 410C; setting the consumer personal preferences—step 420C; presenting a selected product to a consumer—step 430C; presenting to said consumer an advisory message for an alternative consumer product—step 440C; and receiving a consumer selection of the desired product—step 450C, reflecting the consumer decision.

It is noted that further examples for steps 430C and 440C are elaborated in FIG. 4D, particularly describing the step related to the advisory message and associated with an alternative consumer product, if the system analysis, based upon alternatives pertinent to consumer personal preference.

Where appropriate, consumer behavior may be monitored—step 460C which may allow the effectiveness of the advisory message on consumer shopping decisions to be assessed. Accordingly, the user database may be updated—step 465C. Optionally, if the initial advisory message was not effective, based upon system analysis, an additional advisory message may be sent to the product consumer—step 470C. Accordingly, resulting orders may be submitted to the product manufacturer—step 470C.

Reference is now made to the flowchart of FIG. 4D representing selected actions of a method 400D illustrating the flow for providing an advisory message, generated by the backend module, for an alternative product in accordance with the invention.

The method 400D may include identifying the product selected by the consumer—step 410D; retrieving an alternative product by the consumer related to previously selected product—step 420D; getting the relevant personal preferences segment from the consumer preferences profile file associated with the category or grouping of the product—step 430D; generating a set of comparison parameters based upon selected product—step 440D; assigning a weight value for each element defined of the comparison parameter set—step 450D; performing a comparison analysis between the selected consumer product and suggested alternative products—step 460D; classifying the comparison results for each element of the comparison parameters set—step 470D, according to its assigned weight value; generate an advisory message for the highest classified element—step 480D.

It is noted that the advisory message may be a text message, an image, a tabulated message group, a video clip, an audio clip and the like.

Figure 7:
FIG. 7 is a screen shot showing a presentation of a selected product and associated alternative product combine with an advisory message.

It is further noted that classified advisory message may refer to personal preferences or lifestyle choices such as low fat, low calories, no sugar, organic product, gluten free diet, vegan diet and more, as described, for example in FIG. 7.

Regarding lifestyle choices, it is noted that suggestions and messages may be generated according to third-party product grading parameters, such as point systems determined by third parties.

The above listed set of preferences is to be considered as an example for illustrative purposes referring to a shopping platform associated with grocery food. Other preferences may be generated, as will occur to those of the art where the line of product is different, such as fashion, electronics and computers, agricultures, home appliances and the like.

Figure 5:
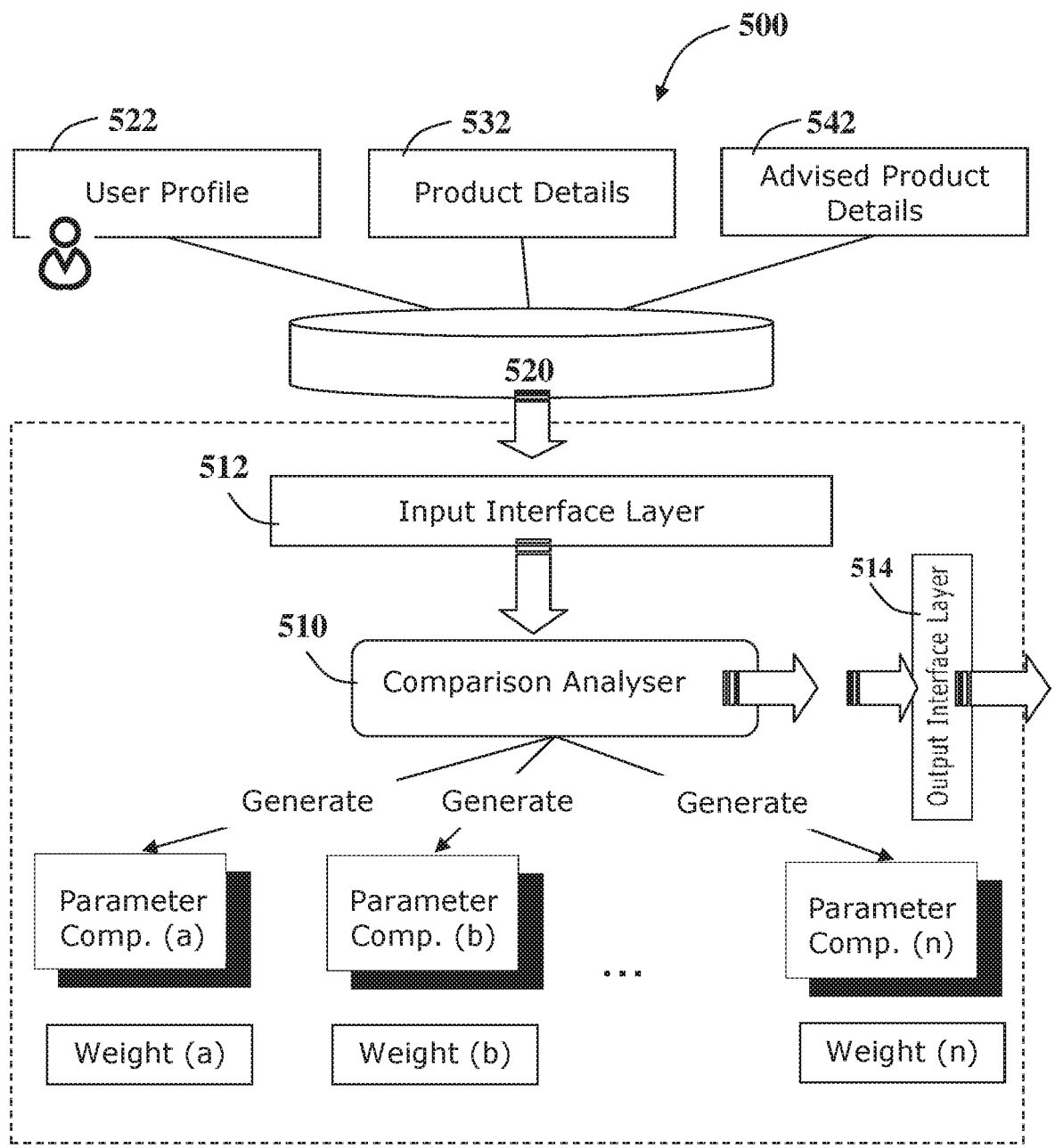
FIG. 5 is a schematic diagram showing the main elements of a possible comparison analyzer module for providing an appropriate advisory message.

Reference is now made to FIG. 5 showing a schematic diagram of the main elements of a comparison analyzer module for computing an appropriate advisory message.

The comparison analyzer module may include the comparison analyzer engine 510 connectable to the backend repository 520 via an input interface layer 512 and outputting analysis results via an output interface layer 514. The backend repository 520 may further include specific databases such as a user database 522 holding user specific data, optionally in a form of user profile files and product database (one or more) associated with specific product manufacturers or retailers for example holding data related to the various products, such as 532 holding data related to the selected product and 534 holding data related to possible alternative products.

The comparison analyzer engine 510 may generate a set of comparison parameters a, b through n according to the specification of the relevant segment of the personal preferences information of the product consumer. Each comparison parameters may further be assigned with a weight value indicating the level of importance of the comparison parameter with respect to consumer personal preferences.

It is a particular feature of the comparison analyzer engine 510 that the set of parameters is open. Accordingly, parameters may be added by third parties such as lifestylists or the like who may introduce additional or alternative grading systems based upon their own lifestyle philosophies and models.

Figure 6:
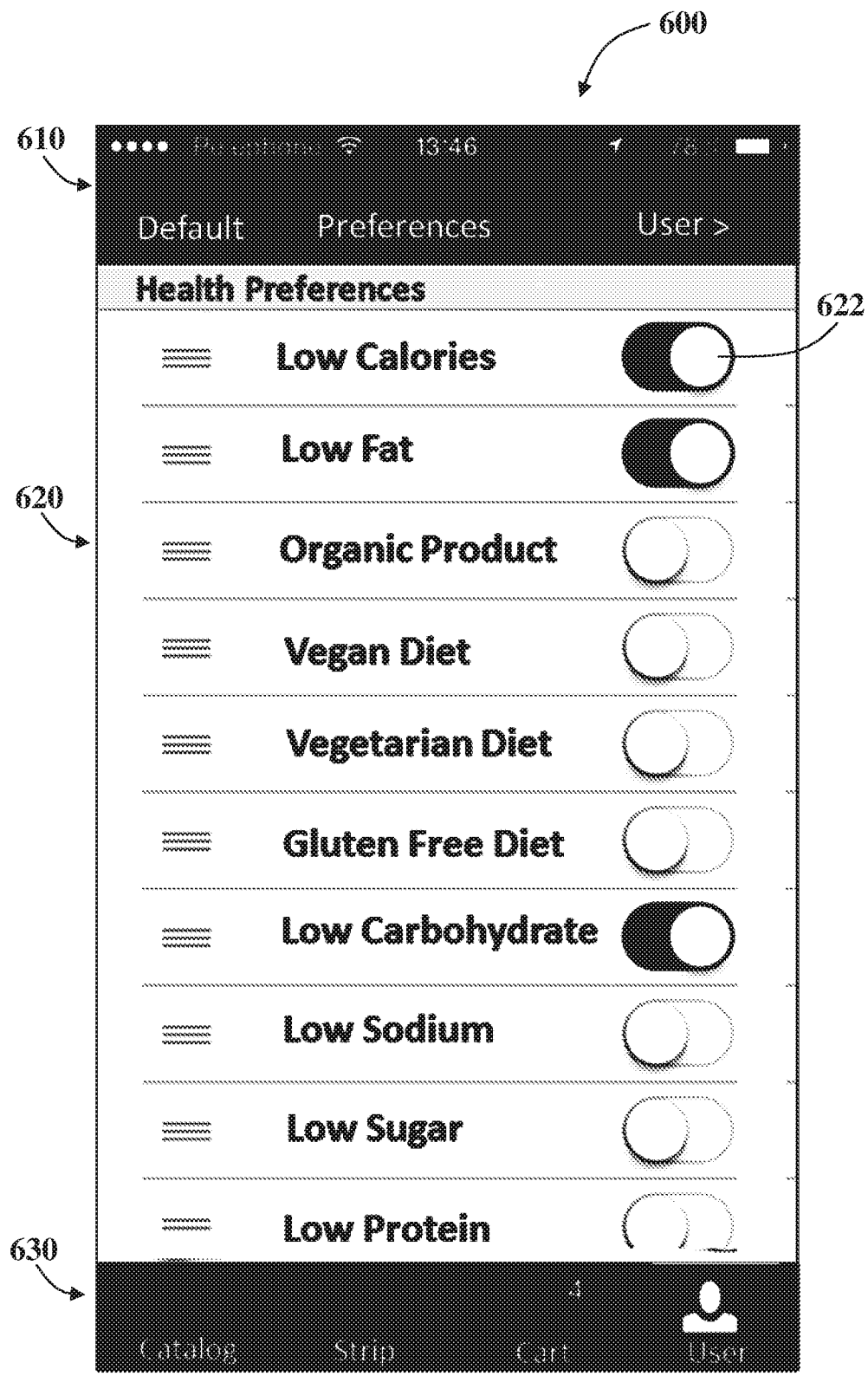
FIG. 6 is a screen shot for defining the consumer preference profile of a possible health preferences.

Sample Screen Shots:

Reference is now made to FIG. 6 showing an illustrative screen shot 600 of a mobile device application for defining the consumer preference profile of a possible health personal preferences for a product consumer related to a shopping platform for grocery products, pharmacy related products, books and the like.

The screen shot 600 of a consumer personal preferences profile may include a header section 610, a profile body section 620 and a bottom section 630. It is noted that the sections, as brought hereinabove, are by way of example and should not be considered as limiting. Other sections may be added or omitted to suit requirements.

The header section 610 may include general mobile device information such as the mobile company, Wi-Fil connection, time, battery level and the like. The header 610 may further include title elements and currently logged in user name.

The body section 620 may include a list of selectable preferences such as Low Calories, Low Fat, Organic Product, Vegan Diet, Vegetarian Diet, Gluten Free Diet, Low Carbohydrate, Low Sugar, Low Sodium and Low Protein. Each selectable preference parameter may be attached with a control element such as 622, operable to set on a parameter or set off, by simply dragging the control element to the desired position.

The bottom section 630 may include a set of controls such as a Catalog button to allow accessing product related data, a Shelf button, a Cart button to allow viewing shopping status, and a user button to allow displaying various personal account parameters.

It is noted that this list of preferences as brought hereinabove is by way of example and should not be considered as limiting. Other preferences may be added or omitted to suit requirements.

Reference is now made to FIG. 7 showing an illustrative screen shot 700 of a mobile device shopping platform application of a currently viewed product and associated alternative products combined with an advisory message based upon analyzing personal preferences and product comparable parameters.

It is of particular importance that the software application is operable to allow for easy switching between product browsing mode and details viewing mode. The product consumer may browse through various products of a specific category or shelf by simply scrolling or swiping. Stopping of scrolling or swiping to enable selection of a product of interest for viewing, may present automatically the currently desired product view at the center coupled with associated product details with no need for any specific user action. Additionally, and in parallel, the product comparison mechanism may be activated in the background, based upon consumer personal preference profiles to present alternative comparable products to the left or right of the viewed product.

Optionally, presenting of an alternative product may use various analysis mechanisms, such as an app-based mechanism performing analysis based upon product availability and adaptability with user preferences. Additionally or alternatively an analysis may be provided incorporating input from an advertising mechanism which may provide a weighting factor to sponsored products. Where appropriate, indication may be provided to inform the user whether a recommended alternative product is generated by the app-based mechanism or the advertising mechanism. For example, a green dot may indicate that the alternative comparable product presented is generated by the app based mechanism perhaps based upon existing product availability and according to personal preferences, whereas an orange dot may be used to indicate that a pre-paid alternative comparable product offering, according to personal preferences has been generated using the advertising mechanism.

It is noted that a product retailer/manufacturer/advertiser may be allowed to select products for promotion, while the system may be operable to combine the desired promotion with consumer personal preferences.

The screen shot 700 captures a particular instant during shopping flow for a specific consumer product 722 viewing a desired product of interest at the moment that scrolling has been stopped for example, and may include a header section 710, a profile body section 720 and a bottom section 730.

The header section 710 may include general mobile device information (not shown) such as the mobile company, Wi-Fi connection, time, battery level and the like. The header 710 may particularly include the message area 712, displaying the advisory message for an alternative product comparable to a currently viewed consumer product. It is noted that the advisory message may be presented as a text message, a video, an image, an audio message or the like as required.

The body section 720 may include a currently viewed product 722, product details sub-section 725 and two alternative products of the same viewable category, being presented based upon the comparison analysis. As appropriate, the consumer product 724 may represent an alternative comparable product "A" of the viewable shelf/category, where product 724 may be generated by an analysis of product availability and adaptability with user preferences for example and marked accordingly with a green dot. Further, the consumer product 726 may represents another alternative comparable product "B" of the viewable shelf/category, where product 726 may be generated by an advertising mechanism and may indicate a sponsored product and may be marked accordingly for example with an orange dot.

Additionally to the details viewed product sub-section 725, the pricing details associated with product 722 may be presented. The cheapest retailer price may be associated with a first manufacturer 714, providing its pricing and the most expensive retailer price may be associated with a second manufacturer 716. It is noted that the pricing section, proving retailers' pricing of the viewable product may be clicked/scrolled/swiped to view the whole range of pricing of all retailers.

The "Add to Cart" button 718 allows the consumer to move the preferred consumer product to consumer cart, finalizing the shopping flow for the current product. Alternatively or additionally, plus and minus icons may be used to add or remove items from a consumer cart.

It is particularly noted that a set of icons 725 are provided representing product details based upon indications of consumer personal preferences associated with the group of currently selected consumer product, such as Calories indications, Proteins indications, Users Ranking, Lifestyle Rankings, Kosher Certification, Religious Dietary Laws and the like. It is noted that the list of product details may be clicked/scrolled/swiped up and down or sideways to view the various available details.

Additionally or alternatively, the presented product details may indicate to a user personalized social ranking of a particular product. For example, the user may be presented with an indication of how popular the product is amongst his/her own social group. To this end, the number of friends who liked or purchased the product may be presented. Furthermore where the user's friends have provided a review, a comment, a rank or a grade pertaining to the particular product, this may be presented alongside the product. Accordingly, a user feedback engine may be provided to receive such social feedback from users.

The bottom section 730 may include a set of controls such as a Catalog button to allow accessing product related data, a "Shelf" button to allow viewing a virtual shelf containing products of the same category/group, a Cart button to allow viewing the list of collected products in the virtual cart, the products availability, products prices, promos and delivery cost and the total of the cart at each available retailer, and a user button to allow displaying various personal account parameters.

It is also noted that the advisory message, illustrated hereinabove as a textual message may be presented in various other forms such as image, tabulated data, video clip, audio clip and the like.

It is according to another aspect of the current disclosure that the products are categorized and presented in a readily navigable manner enabling a user to easily view and select multiple products especially on small screens.

Accordingly, it has been surprisingly found that a particularly suitable categorization may be a hierarchical tree structure having multiple levels where each level has a maximum of four sibling nodes. Using such a structure a user is able to make a simplified choice at each level allowing faster and more precise navigation to a product of choice.

It is noted that in contradistinction to the three level categorization traditionally used by online stores, the current structure does not have too many nodes that need to be scrolled through at each level. Rather, the current structure allows a simple and clear screen to be presented at each level at which a user can select one of only four options. This presentation has been found to be more efficient, and enables the user to target the required product with greater precision, particularly on smaller screens.

In certain embodiments, the hierarchical structure may itself be personalized for a particular user such that categories may be generated, filters applied and the order or selection of nodes at each level prioritized and reordered according to the user's personal usage.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the invention, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the invention has been described in conjunction with specific embodiments thereof, it is evident that other alternatives, modifications, variations and equivalents will be apparent to those skilled in the art. Accordingly, it is intended to embrace all such alternatives, modifications, variations and equivalents that fall within the spirit of the invention and the broad scope of the appended claims.

Additionally, the various embodiments set forth hereinabove are described in term of exemplary block diagrams, flow charts and other illustrations. As will be apparent to those of ordinary skill in the art, the illustrated embodiments and their various alternatives may be implemented without confinement to the illustrated examples. For example, a block diagram and the accompanying description should not be construed as mandating a particular architecture, layout or configuration.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

What is claimed is:

1. A method performable in a digital retail shopping system including a client device in communication with a network, the client device having a display said network connectable to a server and a database of products for purchase, the method comprising:
    enabling a user to browse by scrolling on the display over a list of products for purchase using the digital retail shopping system;
    when the scrolling stops without a further action by the user, presenting a view of a selected product on the display;
    processing a personal preferences profile of the user;
    determining a comparison parameter associated with the selected product and the personal preferences profile of the user;
    based on the comparison parameter, generating an advisory message related to the selected product and the personal preferences profile of the user; and
    presenting said advisory message on the display of the client device with the view of the selected product.

2. The method of claim 1, further comprising:
    assigning the comparison parameter a weight value indicating a relative importance of the comparison parameter with respect to personal preferences of the user.

3. The method of claim 2, further comprising:
    based on the personal preferences of the user and the comparison parameter of the selected product, presenting on the display an alternative product, comparable to the selected product.

4. The method of claim 3, further comprising:
    introducing a comparison parameter from a third party for generating an alternative product for presenting to the user, wherein said advisory message pertains to the alternative product.

5. The method of claim 1, further comprising:
    introducing a comparison parameter from a third party for selecting a product by the user.

6. The method of claim 1, further comprising:
    retrieving a detail of a selected product from the database of products for purchase;
    when the scrolling stops without a further action by the user, presenting the detail with the view of the selected product on the display.

7. The method of claim 1, further comprising:
    continuously monitoring user behavior and updating the personal preferences profile.

8. A graphical user interface for use in a digital retail shopping system, said graphical user interface enabled in a client device in communication with a network, the client device having a display, said network connectable to a server and a database of products for purchase, wherein a detail of a selected product is retrieved from the database of products for purchase, wherein a personal preferences profile of the user is processed to determine a comparison parameter associated with the detail of the selected product, wherein based on the comparison parameter, an advisory message is generated related to the selected product and the personal preferences profile of the user, the graphical user interface further configured to:
  enable a user to browse by scrolling on the display over a list of products for purchase using the digital retail shopping system;
  when the scrolling stops without a further action by the user, present a view of a selected product on the display;
  present said advisory message on the display of the client device with the view of the selected product.

9. The graphical user interface of claim 8, further configured to:
  assign the comparison parameter a weight value indicating a relative importance of the comparison parameter with respect to personal preferences of the user.

10. The graphical user interface of claim 9, wherein responsive to the personal preferences profile of the user and the comparison parameter of the selected product, a view of an alternative product, comparable to the selected product, is presented on the display.

11. The graphical user interface of claim 10, further configured to:
  introduce a comparison parameter from a third party for selecting a product by the user.

12. The graphical user interface of claim 8, further configured to:
  introduce a comparison parameter from a third party for generating an alternative product for said presenting to the user, wherein said advisory message pertains to the alternative product.

13. The graphical user interface of claim 8, wherein a detail of a selected product is retrieved from the database of products for purchase, the graphical user interface further configured to:
  enable a user to browse by scrolling over a list of products on the display;
  when the scrolling stops without a further action by the user, present the detail with the view of the selected product on the display.

14. The graphical user interface of claim 8, wherein user behavior is continuously monitored and the personal preferences profile is updated responsive to the user behavior as monitored.

15. A non-transitory computer-readable storage medium in a digital retail shopping system including a client device in communication with a network, the client device having a display, said network connected to a server and a database of products for purchase, the computer-readable storage medium storing programming instructions that, if executed by a processor in the digital retail shopping system, are operable to cause the digital retail shopping system to perform operations comprising:
  enabling a user to browse by scrolling on the display over a list of products for purchase using the digital retail shopping system;
  when the scrolling stops without a further action by the user, presenting a view of a selected product on the display;
  processing a personal preferences profile of the user;
  determining a comparison parameter associated with the detail of the selected product and the personal preferences profile of the user;
  based on the comparison parameter, generating an advisory message related to the selected product and the personal preferences profile of the user; and
  presenting said advisory message on the display of the client device with the view of the selected product.

16. The non-transitory computer-readable storage medium of claim 15, storing programming instructions that, if executed by the processor, are operable to cause the computerized device to perform a further operation comprising:
  assigning the comparison parameter respectively a weight value indicating a relative importance of the comparison parameter with respect to personal preferences of the user.

17. The non-transitory computer-readable storage medium of claim 16, storing programming instructions that, if executed by the processor, are operable to cause the computerized device to perform a further operation comprising:
  based on the personal preferences profile of the user and the comparison parameter of the selected product, presenting on the display an alternative product, comparable to the selected product.

18. The non-transitory computer-readable storage medium of claim 17, storing programming instructions that, if executed by the processor, are operable to cause the computerized device to perform a further operation comprising:
  introducing a comparison parameter from a third party for:
    (i) selecting a product by the user; or
    (ii) generating an alternative product for said presenting to the user, wherein said advisory message pertains to the alternative product.

19. The non-transitory computer-readable storage medium of claim 15, storing programming instructions that, if executed by the processor, are operable to cause the computerized device to perform further operations comprising:
  retrieving a detail of a selected product from the database of products for purchase;
  when the scrolling stops without a further action by the user, presenting the detail with the view of the selected product and the detail of the selected product.

20. The non-transitory computer-readable storage medium of claim 15, storing programming instructions that, if executed by the processor, are operable to cause the digital retail shopping system to perform a further operation comprising:
  continuously monitoring user behavior and updating the personal preferences profile.

* * * * *